United States Patent
Shimokawa et al.

(10) Patent No.: US 8,536,510 B2
(45) Date of Patent: Sep. 17, 2013

(54) MULTI-OPTICAL AXIS PHOTOELECTRIC SENSOR

(75) Inventors: Satoru Shimokawa, Otsu (JP); Takayoshi Takahara, Kusatsu (JP); Shunsuke Mogi, Kusatsu (JP); Toshinori Sato, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 49 days.

(21) Appl. No.: 13/254,221

(22) PCT Filed: Jul. 27, 2010

(86) PCT No.: PCT/JP2010/062572
§ 371 (c)(1),
(2), (4) Date: Oct. 13, 2011

(87) PCT Pub. No.: WO2011/013643
PCT Pub. Date: Feb. 3, 2011

(65) Prior Publication Data
US 2012/0112049 A1 May 10, 2012

(30) Foreign Application Priority Data
Jul. 30, 2009 (JP) ................................. 2009-178327

(51) Int. Cl.
*H01J 40/14* (2006.01)
(52) U.S. Cl.
USPC ........................... 250/221; 250/239; 340/555
(58) Field of Classification Search
USPC .................. 250/221, 222.1, 239, 216, 227.28, 250/214 R; 340/540, 555, 556, 557; 359/618
See application file for complete search history.

(56) References Cited

U.S. PATENT DOCUMENTS
7,084,387 B2 * 8/2006 Higuchi et al. ............... 250/221

FOREIGN PATENT DOCUMENTS
| CN | 1755856 A | 4/2006 |
| JP | 10-074432 A | 3/1998 |
| JP | 2000-251595 A | 9/2000 |
| JP | 2002-075149 A | 3/2002 |

(Continued)

OTHER PUBLICATIONS

The summary of the office action issued on Jun. 26, 2013, to the corresponding Chinese patent application.

*Primary Examiner* — Kevin Pyo
(74) *Attorney, Agent, or Firm* — Marvin A. Motsenbocker; Mots Law, PLLC (57) ABSTRACT

A multi-optical axis photoelectric sensor is provided having a casing that forms an outer shape of each of a projector and an optical receiver. The casing includes a frame body having a front face and two ends opened, a pair of caps to cover both ends of the frame body, and a light transmissive plate to cover the opened front face of the frame body 3. In the inner surfaces of both side plates of the frame body, supports are formed extending along the corresponding side edges of the opening of the front face. Both side edges of the light transmissive plate 6 are supported by the supports, and both ends thereof are supported by the caps. Portions of the caps that support the light transmissive plate 6 include communication portions to communicate with the supports of the frame body 3, and a string-like elastic member is disposed around a closed loop formed by each support and each communication portion. The light transmissive plate 6 is held between the string-like elastic member and at least one fixing member disposed for the frame body and the caps. This configuration facilitates fixing of the light transmissive plate and changing of a size of the frame body.

8 Claims, 8 Drawing Sheets

(56) References Cited

FOREIGN PATENT DOCUMENTS

| JP | 2002-124170 A | 4/2002 |
| JP | 2005-285500 A | 10/2005 |
| JP | 2006-107797 A | 4/2006 |

* cited by examiner

MULTI-OPTICAL AXIS PHOTOELECTRIC SENSOR

TECHNICAL FIELD

The present invention relates to a multi-optical axis photoelectric sensor that detects an object by light entrance/obstruction state of a plurality of optical axes provided between a projector and an optical receiver, which are disposed opposite each other. Particularly embodiments relate to a structure in which a light transmissive plate that closes an opening of a front surface in each of the projector and the optical receiver is fixed to the frame body while being brought into close contact with the frame body.

BACKGROUND ART

Each of the projector and the optical receiver of the multi-optical axis photoelectric sensor is configured such that an optical unit in which a plurality of optical elements are provided and a control board are accommodated in a rectangular-solid casing. Generally, in each casing, the front surface and both end surfaces of the frame body are opened, the end surfaces are closed by caps, respectively, and the opened front surface is interiorly closed by the light transmissive plate. A light transmission surface or a light receiving surface of the optical unit in the casing is oriented toward the opened front surface, whereby the opening of the front surface closed by the light transmissive plate acts as a window portion that transmits light.

Because this kind of sensor is possibly disposed in the field where dust and liquids fly, the caps at both ends are assembled in the frame body with rubber packings interposed therebetween. Similarly the light transmissive plate is fixed such that a gap is not formed between an opening edge of the frame body and the light transmissive plate.

For example, there is disclosed a light transmissive plate fixing method for coupling an end edge portion along the opening of the front surface of the frame body and the light transmissive plate using a double-sided adhesive tape (see paragraph number 0022 of Patent Document 1)). Sometimes a sealing agent having adhesion is used instead of the double-sided adhesive tape.

There is also a method in which a ring rubber is disposed between the opening and the light transmissive plate according to a shape of the opening and the light transmissive plate is fixed while being pressed by the rubber. Although the fixing method is directly disclosed, Patent Document 2 describes that a ring rubber is attached to an peripheral edge of the optical unit accommodated in the casing, the front surface of the frame body having the window portion is screwed while being pressed against the optical unit, and the front surface of the frame body is covered with the light transmissive plate (see paragraphs 0013 to 0016 and FIGS. 1 to 3 of Patent Document 2).

Figure 14:
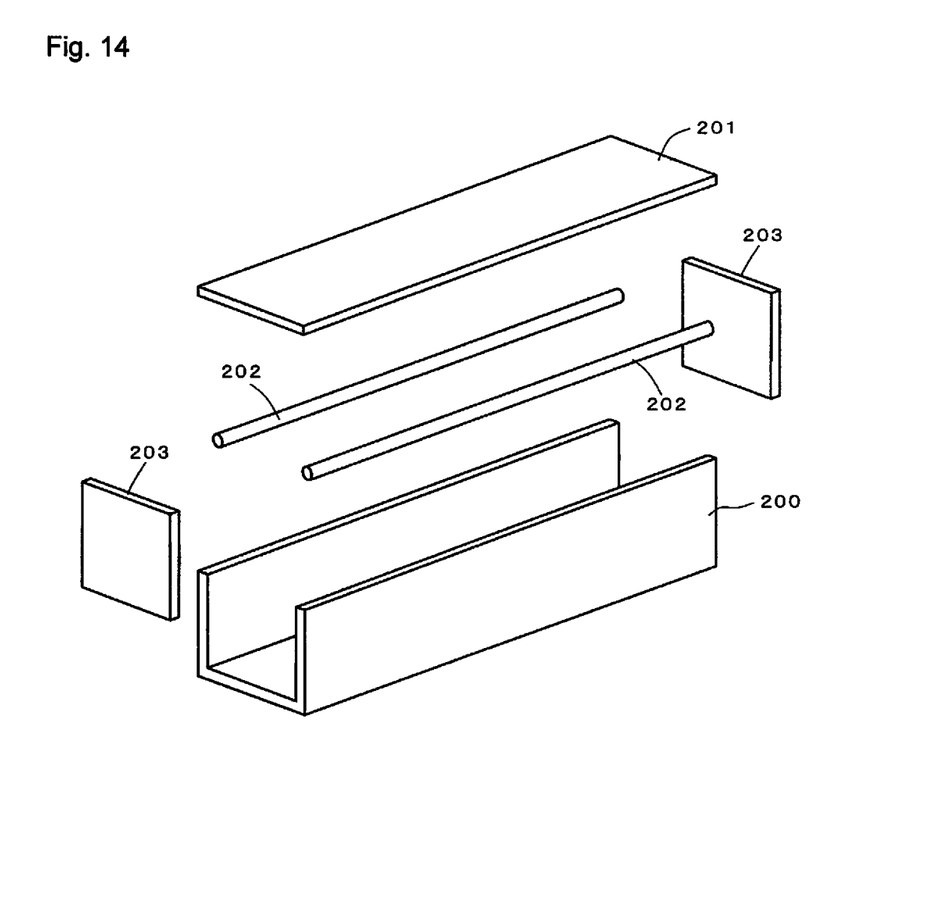
FIG. 14 is an explanatory view schematically illustrating a conventional method for sealing the frame body.

Additionally, there is proposed a method of FIG. 14 in consideration of a change in length of the frame body in each of the projector and the optical receiver according to an installation environment or a utilization purpose of the sensor.

FIG. 14 schematically illustrates a main configuration relating to sealing of the opening of the frame body. String-like rubbers 202 and 202 are interposed between a light transmissive plate 201 and both side edges of an opening of a front surface of a frame body 200, and plate-like rubbers 203 and 203 are disposed in an opening of both end surfaces. The light transmissive plate 201 is fixed while being sandwiched between a pressing member (not illustrated) and the string-like rubbers 202 and 202, the plate-like rubber 203 is fixed while being pressed against the end surface of the frame body 200 by a cap (not illustrated). At this point, a plate surface of the plate-like rubber 200 and the end edges of the string-like rubber 202 are brought into close contact with each other, and the opening of the frame body 200 can be sealed in a waterproof state.

PRIOR ART DOCUMENTS

Patent Documents

Patent Document 1: Japanese Unexamined Patent Publication No. 2002-75149
Patent Document 2: Japanese Unexamined Patent Publication No. 2000-251595

SUMMARY OF THE INVENTION

Problems to be Solved by the Invention

In the method for fixing the light transmissive plate using the double-sided adhesive tape, because of a weak chemical resistance of the double-sided adhesive tape, there is a risk that a sealing structure of the light transmissive plate is not retained when chemicals act on the double-sided adhesive tape. In the method in which the sealing agent is used, there is also a risk of generating the gap between the light transmissive plate and the frame body by unevenness in application of the sealing agent. When the application is incomplete, it is necessary to apply the sealing agent again after the applied sealing agent is removed, great care is required.

In the sealing method in which the ring rubber is used, because of the use of the ring rubber having the size corresponding to the length of the frame body, it is necessary to produce the ring rubber having the different size in each of the different kinds of the frame bodies having the different lengths. In the case of the use of the ring rubber, it is necessary to form a mechanism (such as a step and a groove) that supports the rubber along the side edges and the end edges of the opening. Therefore, different molds are required to produce the frame bodies having the different lengths. Accordingly, cost increases, and it is difficult to deal with the change in length of the frame body.

On the other hand, in the sealing method of FIG. 14, the long string-like rubber 202 can be used by cutting out the string-like rubber 202 according to the length of the frame body. It is not necessary to process a width direction of the frame body 200. Therefore, the long frame material in which one surface is opened is molded, and the frame body 200 having the necessary length can be cut out from the frame material to easily deal with the change in length of the frame body 200.

However, in the sealing method of FIG. 14, it is necessary to bring each end edge of the string-like rubber 200 into close contact with the plate surface of the plate-like rubber 200, and a burden of a worker in an assembly line increases. When the sizes of the two string-like rubbers 202 and 202 or coupling strength at each coupled point varies, accuracy of the sealing is significantly degraded.

In view of the foregoing, a problem of the art is to be able to achieve the fixing of the light transmissive plate to the frame body with a simple configuration and easily deal with the size change of the frame body.

Embodiments of the present invention is applied to a multi-optical axis photoelectric sensor in which an outer shape of each of a projector and an optical receiver is formed by a casing including a frame body, a pair of caps, and a light transmissive plate, a front surface and both end surfaces of the frame body being opened, the caps closing the opened end surfaces of the frame body, the light transmissive plate closing the opened front surface of the frame body.

In embodiments, a long support that extends along a corresponding side edge of an opening of the front surface is formed in an inner surface of each side plate of the frame body. The side edges of the light transmissive plate are supported by each support of the frame body, and end portions of the light transmissive plate are supported by the caps, respectively. A communication portion communicated with each support of the frame body is included in a portion of the cap, which supports the light transmissive plate, and a string-like elastic member is disposed so as to go around a closed loop including each support of the frame body and the communication portion of each cap. The light transmissive plate is sandwiched and held between at least one of fixing members and the string-like elastic member, the fixing members being disposed with respect to the frame body and the caps.

According to the above configuration, the string-like elastic member is disposed in the closed loop formed by the supports at the side edges of the frame body and the communication portions of the cap at both the ends, and the light transmissive plate is sandwiched and held between at least one of fixing members disposed with respect to the frame body and the caps and the string-like elastic member. Therefore, the change in length of the frame body can be dealt with by providing the string-like elastic member that goes around the formed closed loop. Similarly the change in width of the frame body can easily be dealt with by changing the length of the elastic member used. Therefore, it is not necessary that the elastic member be separately prepared according to the size of the frame body, but the light transmissive plate can be fixed to the opening of the frame body by the simple work.

In a preferred mode of the multi-optical axis photoelectric sensor, the string-like elastic member is formed into a length that go around the closed loop including each support of the frame body and the communication portion of each cap, and end edges of the string-like elastic member are bonded with a bonding agent in the communication portion of one of the caps. When the elastic members are connected by the bonding agent, it is necessary to take care of the coupled portion of the elastic member such that the coupled portion of the elastic member is not swelled to generate floating in the light transmissive plate or such that the coupling is weakened to drop out. However, according to the above mode, because the point to which attention should be paid is restricted at only one point, an burden of a worker can be reduced. The width direction is smaller than the length direction in a degree of expansion and contraction by a temperature change of the casing. Therefore, when the end edges of the elastic member are coupled at a position corresponding to the width direction of the casing, even if the elastic member is strained by the change in shape on the longitudinal side of the frame body, the influence of the tension on the coupled portion can be prevented. Accordingly, the light transmissive plate can more stably be fixed by the string-like elastic member.

In another preferred mode of the multi-optical axis photoelectric sensor, a groove is formed in each support of the frame body, a pair of grooves communicated with the groove in each support of the frame body and a groove along the end edge of the supported light transmissive plate are included in the communication portion of each cap. Additionally, the string-like elastic member is fitted in the grooves of the frame body and each cap so as to go around the closed loop formed by the grooves. Therefore, the string-like elastic member can more stably be disposed by fitting the string-like elastic member in the groove.

In another preferred mode of the multi-optical axis photoelectric sensor, the front surface of the frame body is opened while a belt-shaped stopper plates are left at both side edges, and a rod-shaped holddown member is inserted between each stopper plate and the light transmissive plate supported by the support with the stripe-like elastic member interposed therebetween. A portion of each cap, in which the light transmissive plate is supported, is covered with a cap cover in which a pair of pawls are provided at one end edge. A gap is provided between the rod-shaped holddown member and each of end surfaces of the frame body, and each cap cover is fixed to the cap while the pawl is inserted in each gap.

According to the above mode, the range in which the light transmissive plate is accommodated in the frame body is fixed such that the light transmissive plate is pressed against the elastic member by a pressing force from the holddown member inserted between the light transmissive plate and the stopper plate. The portion of the light transmissive plate, which is supported by the cap, is fixed such that the light transmissive plate is pressed against the elastic member disposed on the cap by the pressing force generated by the fixing of the cap cover. The pawl of the cap cover is inserted in the gap generated in each of the end portions of the groove of the frame body, and the cap cover is fixed to the cap. Therefore, the light transmissive plate can be pressed while the cap cover is brought into close contact with the cap and the frame body, and the frame body can sufficiently and easily be sealed.

Effects of the Invention

According to an embodiment, the light transmissive plate can easily be fixed to the opening of the frame body by the use of the string-like elastic member. Even in the case of the plurality of kinds of the frame bodies having different sizes, it is not necessary to produce the particular elastic member in each frame body. Therefore, cost can be reduced.

EMBODIMENT FOR CARRYING OUT THE INVENTION

Figure 1:
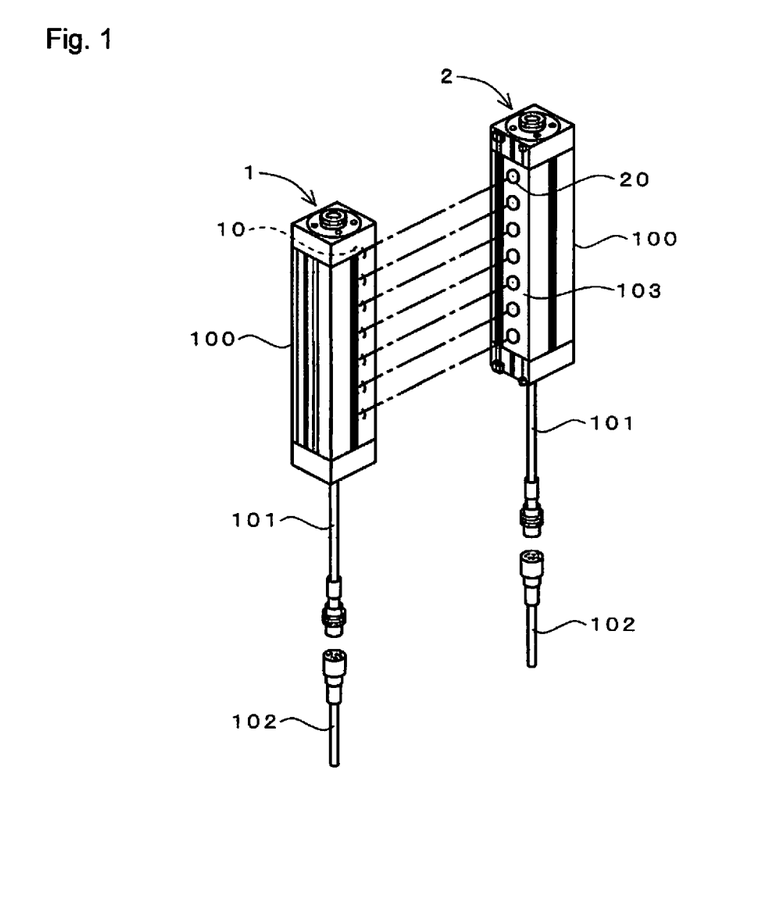
FIG. 1 is a perspective view illustrating an appearance of a multi-optical axis photoelectric sensor.

FIG. 1 illustrates an appearance of a multi-optical axis photoelectric sensor according to an embodiment.

Each of a projector 1 and an optical receiver 2 of the multi-optical axis photoelectric sensor is configured such that a plurality of optical elements (light emitting elements 10 in the projector 1 and light receiving elements 20 in the optical receiver 2) and a control board (not illustrated) are accommodated in a rectangular-solid casing 100. A cord 101 in which various signal lines are collected is drawn from a lower end of each casing 100. A extension second cord 102 is connected to the cord 101.

A window portion 103 are formed in one of side surfaces of each casing 100 in order to transmit light. The window portion 103 is formed by closing an opening of a front surface of a frame body 3 described later with a light transmissive plate 6. The light emitting elements 10 and the light receiving elements 20 are disposed so as to be arrayed along a longitudinal direction of the casing 100. Light transmission surfaces of the light emitting elements 10 and light receiving surfaces of the light receiving elements 20 are disposed opposite the window portions 103. The projector 1 and the optical receiver 2 are disposed opposite each other with a predetermined interval such that each light emitting element 10 and each light receiving element 20 are disposed opposite each other on a one-to-one basis. Therefore, positions or orientations of optical axes of the light emitting element 10 and the light receiving element 20 are aligned with each other in each combination of the light emitting element 10 and the light receiving element 20.

The light emitting elements 10 and the light receiving elements 20 are incorporated in an optical unit 105 along with corresponding processing circuits, respectively.

Figure 2:
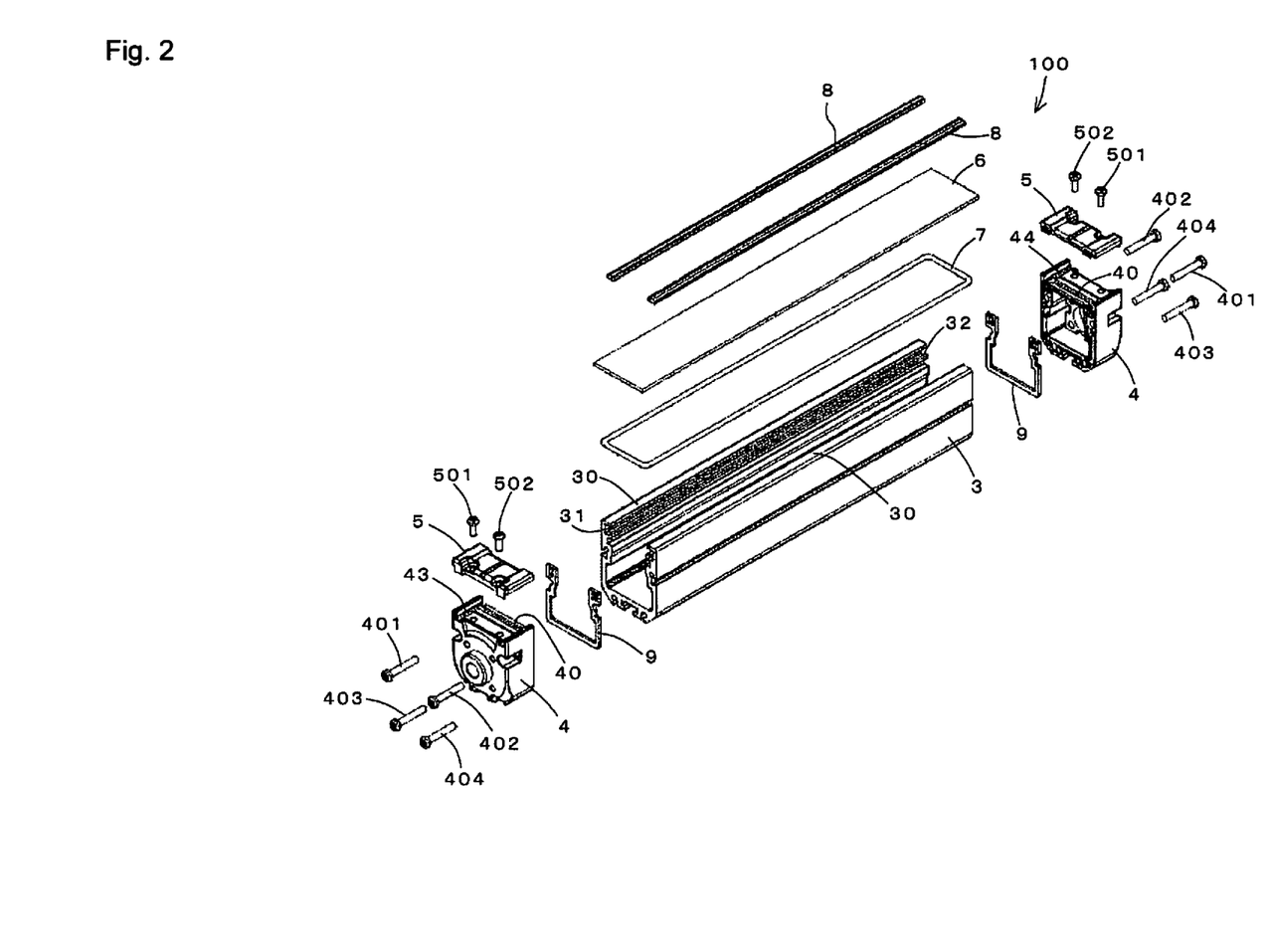
FIG. 2 is an exploded perspective view illustrating a configuration of a casing of a projector and an optical receiver.

FIG. 2 is an exploded perspective view illustrating a configuration of the casing 100 of the projector 1 and the optical receiver 2. In FIG. 2 and the following drawings, which illustrate the casing 100, the casing 100 is illustrated while a front surface side of the casing is oriented upward.

In the casing 100 of the embodiment, the front surface and both end surfaces of the frame body 3 are opened. The end surfaces are closed by caps 4 and cap covers 5, respectively, and the opening of the front surface is closed by the light transmissive plate 6, thereby forming the casing 100.

Each cap 4 is fixed to an end edge of the frame body 3 by screws 401 to 404 with a rubber packing 9 interposed therebetween. The rubber packing 9 has a shape opposite to the opening end surface of the frame body 3. An upper surface (surface corresponding to the front surface of the casing 100) of the cap 4 is formed lower than the frame body 3, and the cap cover 5 is fixed to the upper surface by screws 501 and 502.

The front surface of the frame body 3 is opened while band-shaped stopper plates 30 and 30 are left at both side edges. In upper end portions in inner surfaces of side plates of the frame body 3, long supports 31 and 31 are formed over a total length of the frame body 3. Stand-up portions 32 and 32 are formed at side edges of the supports 31 and 31, whereby the support 31 and 31 are formed into groove shapes.

In the embodiment, a string-like rubber (hereinafter referred to as a "string-like rubber 7" or simply referred to as a "rubber 7") is accommodated in the groove of each support 31, the side edges of the light transmissive plate 6 are supported in the supports 31 with the string-like rubber 7 interposed therebetween, and a rod-shaped holddown member 8 is inserted between each side edge of the light transmissive plate 6 and the stopper plate 30 to press the light transmissive plate 6.

The light transmissive plate 6 of the embodiment is longer than the frame body 3, and end portions of the light transmissive plate 6, which are projected from the frame body 3, are supported by the upper surfaces of the caps 4. Grooves 40, 43, and 44 are formed in the upper surface of the cap 4 in order to fit the string-like rubber 7 therein, the end edge of the light transmissive plate 6 on the cap 4 is supported by the string-like rubber 7 fitted in the grooves 40, 43, and 44. A portion of the light transmissive plate 6, which is projected from the frame body 3, is sandwiched by assembling the cap cover 5 in the cap 4, and fixed between the cap cover 5 and the string-like rubber 7

Figure 3:
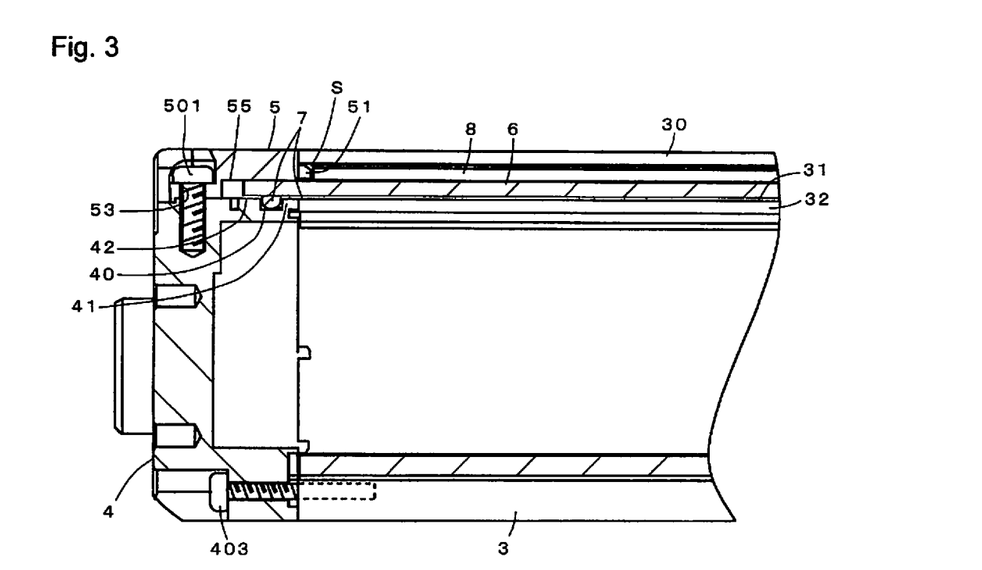
FIG. 3 is a sectional view of the casing in a length direction.
Figure 4:
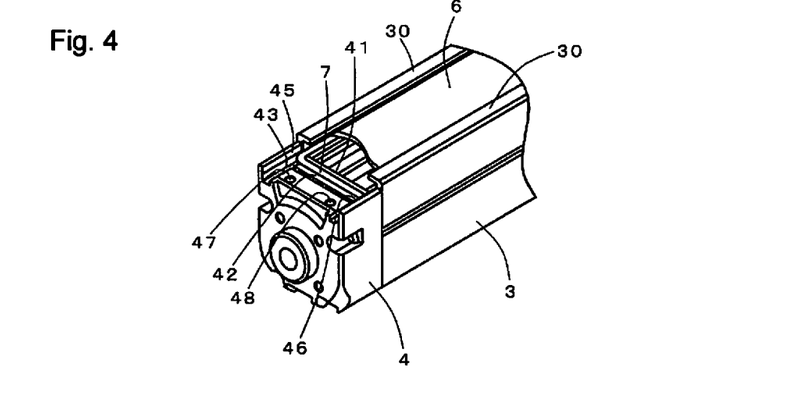
FIG. 4 is a perspective view illustrating a disposition state of a string-like rubber.
Figure 5:
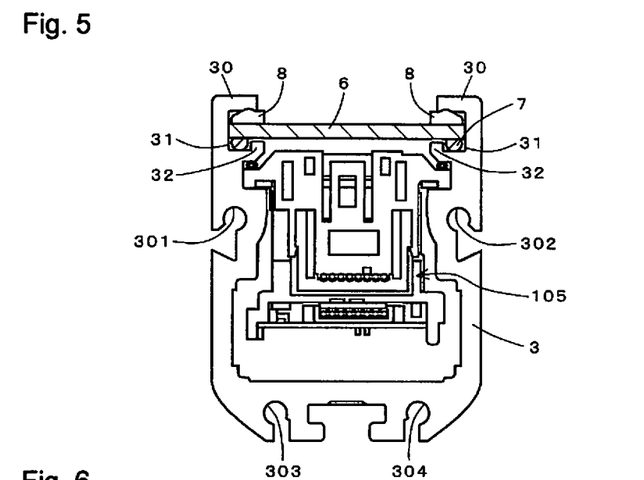
FIG. 5 is a front view illustrating an internal configuration of a frame body when the frame body is viewed from an opening end surface.

FIG. 3 is a sectional view illustrating a configuration of the casing 100 in a length direction after the assembling. FIG. 4 is a perspective view illustrating a disposition state of the string-like rubber 7 while the front face of the casing is partially broken. FIG. 5 is a view illustrating the support state of the light transmissive plate 6 in the frame body 3 when the opened end surface of the frame body 3 is viewed from the front side.

FIG. 5 also illustrates the light transmissive plate 6 and the string-like rubber 7 in section. In FIG. 5, the numeral 105 designates the optical unit including the optical elements, and the numerals 301 to 304 designate screw holes corresponding to the crews 401 to 404.

A configuration that fixes the light transmissive plate 6 of the casing 100 will be described below with reference to FIGS. 2 to 5 and the drawings from FIG. 6 as appropriate.

The grooves 43 and 44 in the upper surfaces of the caps 4 are formed along both the side edges of the upper surfaces. The groove 40 is formed along a width direction at the end edge on the side located opposite to the frame body 3 of the cap 4 so as to connect the grooves 43 or the grooves 44. Projected threads 41 and 42 are formed on both sides of the groove 40. Side plates of the cap 4 are projected from the upper surface of the cap 4, thereby forming support walls 45 and 46 on the outsides of the grooves 43 and 44.

Figure 6:
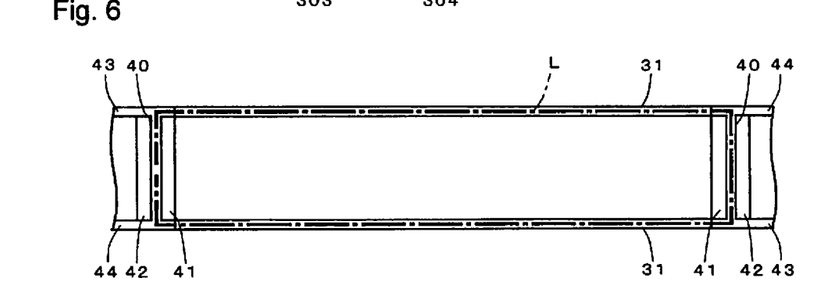
FIG. 6 is an explanatory view schematically illustrating a relationship among a groove in the frame body, a groove of a cap, and a projection.

FIG. 6 illustrates a relationship among the supports 31 and 31 at the side edges of the frame body 3, the grooves 40, 43, and 44 of each cap 4, and the projected threads 41 and 42.

The lengths of the groove 40 of the cap 4 and the projected threads 41 and 42 on both the sides of the groove 40 correspond to an opening width in the front surface of the frame body 3. Accordingly, when the cap 4 is assembled at each of the end edges of the frame body 3, a corner portion located closer to the frame body 3 of the projected thread 41 diagonally faces a corner portion at the end edge of the support 31. As illustrated in FIG. 3, the upper surfaces of the projected threads 41 and 42 are flush with the upper surface of the stand-up portion 32 of the support 31, and depths of the grooves 40, 43, and 44 and the groove of the support 31 are unified. Therefore, as illustrated in FIG. 6, the groove of the support 31 of the frame body 3 and the groove 40 of the cap 4 are communicated through parts of the grooves 43 and 44.

Figure 7:
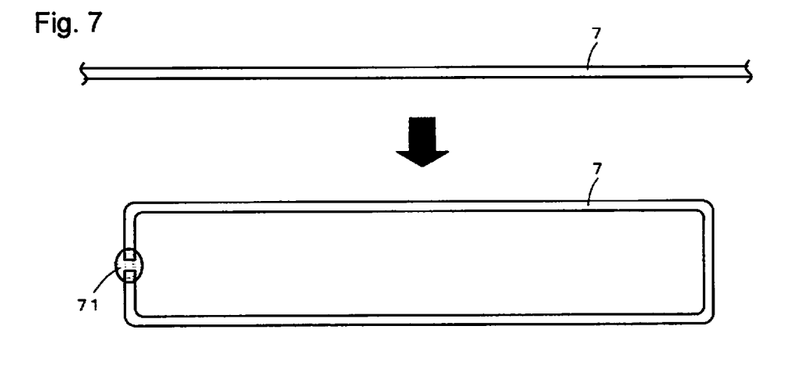
FIG. 7 is an explanatory view illustrating a method for coupling the string-like rubber.

The string-like rubber 7 is set to the length corresponding to a loop route L formed by the communication, and the string-like rubber 7 is fitted in the grooves of the supports 31 and 31 and the grooves 40, 43, and 44 of the caps 4 and 4 so as to go around the loop route L. As is clear from comparison of FIGS. 6 and 7, end portions of the string-like rubber 7 are coupled by a sealing agent 71 having adhesion in the groove 40 of one of the caps 4.

In the embodiment, the sealing agent 71 having the adhesion is used as a bonding agent that couples the end portions of the string-like rubber 7. Alternatively, a thermosetting bonding agent or an ultraviolet curable bonding agent may be used as the bonding agent.

It is not always necessary that the end portions of the string-like rubber 7 be coupled using the bonding agent. For example, the length of the string-like rubber 7 is set slightly longer than the loop route L, and the string-like rubber 7 is fitted in the groove 40 while the end portions of the string-like rubber 7 are overlapped and compressed, whereby an adhesion force between the rubber is enhanced by reaction of the overlapped rubbers. Therefore, even if the bonding agent is not used, the end portions of the string-like rubber 7 can be maintained in the closely-contact state, and the string-like rubber 7 can stably be disposed in the loop route 7.

The support walls 45 and 46 on both the sides of the cap 4 assembled in the frame body 3 is located at the same level as the lower surface of the stopper plate 30. After the string-like rubber 7 is disposed, the light transmissive plate 6 is slid with the support walls 45 and 46 of one of the caps 4 as a guide, which allows the light transmissive plate 6 to be inserted in a space between the string-like rubber 7 and the stopper plate 30 of the frame body 3.

Figure 8:
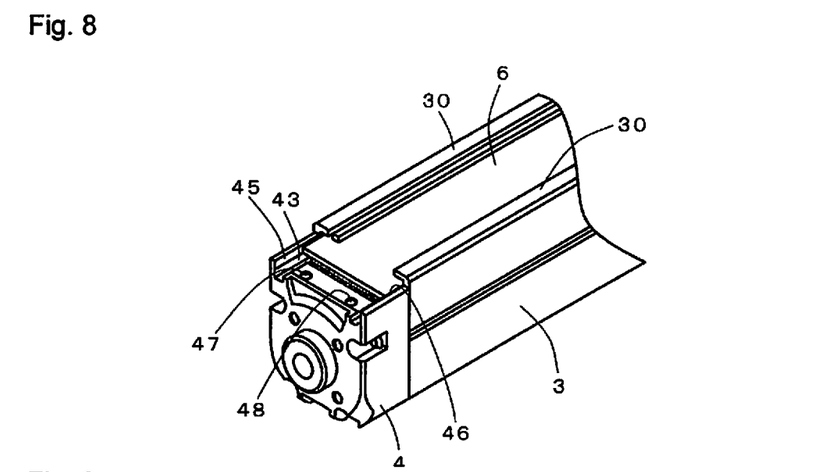
FIG. 8 is a perspective view illustrating a state in which a light transmissive plate is disposed.

FIG. 8 illustrates a state in which the insertion of the light transmissive plate 6 is completed. As is clear from comparison of FIGS. 8 and 4, the light transmissive plate 6 is disposed such that ranges in which the string-like rubber 7 is disposed in the caps 4 are covered therewith. As illustrated in FIGS. 3 and 5, because the depths of the groove of the support 31 and the grooves 40, 43, and 44 of the cap 4 are set smaller than a diameter of the accommodated string-like rubber 7, portions of the string-like rubber 7 projected from the support 31 and the grooves 40, 43, and 44 come contact with the lower surface of the light transmissive plate 6 to support the light transmissive plate 6.

The holddown members 8 are a rod-shaped resin molding product having flexibility, and the holddown members 8 are inserted in a gap between the light transmissive plate 6 and each of the stopper plates 30 and 30 one by one. The light transmissive plate 6 is pressed against the string-like rubber 7 by inserting the holddown member 8.

Each holddown member 8 is formed shorter than the length of the frame body 3, and therefore a gap S is generated between the end edges of the frame body 3 and the end edges of each of the holddown member 8 as illustrated in FIG. 3.

Figure 9:
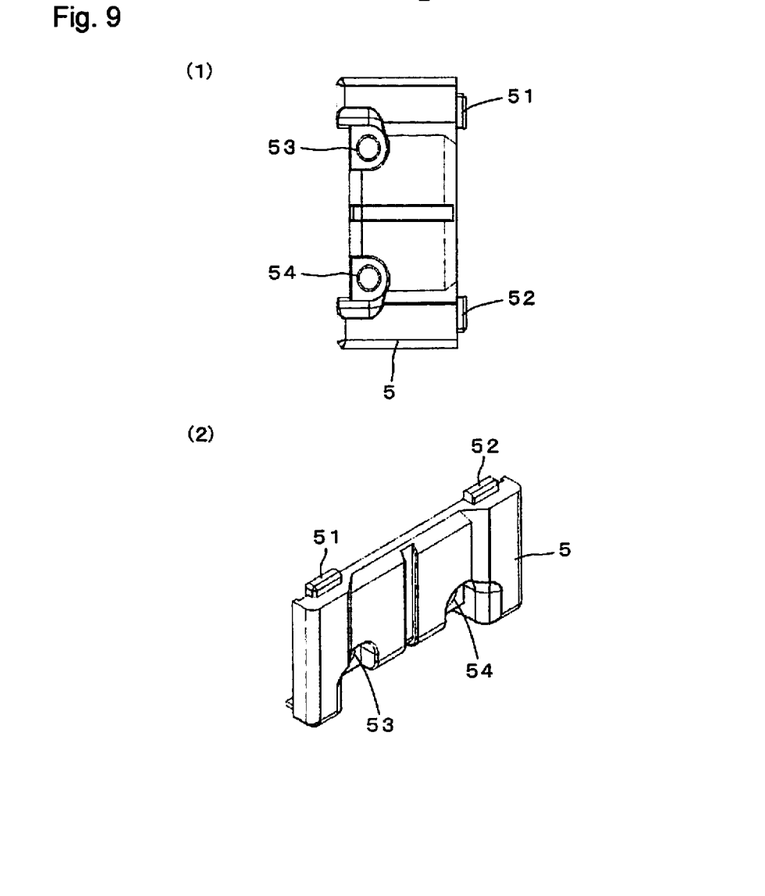
FIG. 9 is a perspective view illustrating a configuration of a cap cover.

As illustrated in FIG. 9, in the cap cover 5, a pair of screw holes 53 and 54 is made in a front end portion in order to screw the cap cover 5 on the cap 4, and a pair of pawls 51 and 52 is projected from a rear end edge coupled to the frame body 3. An interval between the pawls 51 and 52 are set to the length corresponding to the opening width in the front surface of the frame body 3. As illustrated in FIG. 3, in the lower surface of the cap cover 5, a notch 55 having a height corresponding to a thickness of the light transmissive plate 6 is formed in a range corresponding to the light transmissive plate 6.

Each of the pawls 51 and 52 is inserted in the gap S between the holddown member 8 and the end edge of the frame body 3, and the screw holes 53 and 54 and the screw holes 47 and 48 in the cap 4 are fixed with screws 501 and 502, thereby fixing the cap cover 5 to the cap 4 and the frame body 3. At this point, as illustrated in FIG. 3, because the portion of the light transmissive plate 6, which is projected from the frame body 3, comes into contact with the notch 55 of the cap cover 5, the light transmissive plate 6 is pressed against the lower string-like rubber 7 by a pressing force from the notch 55 in association with the cap cover 5 screwed on the cap 4.

As described above, in the light transmissive plate 6, the whole periphery of the end edge in the lower surface is supported by the string-like rubber 7, the range accommodated in the frame body 3 is pressed against the string-like rubber 7 by the pressing force from the holddown member 8, and the range projected from the upper surface of the cap 4 is pressed against the string-like rubber 7 by the pressing force from the cap cover 5. Therefore, the light transmissive plate 6 is sandwiched and fixed between the string-like rubber 7 and a pressing member (the holddown member 8 and the stopper plate 30 or the cap cover 5) by a restoring force of the string-like rubber 7 and the pressing force from the pressing member. Accordingly, the whole of the opening end edge formed by a boundary between the frame body 3 and the stopper plates 30 and 30 of the frame body 3 and the cap cover 5 is sealed by the one string-like rubber 7.

As described above, in the embodiment, the window portion 103 of the casing 100 can be sealed by the one string-like rubber 7 according to the length of the loop route L including the support 31 and the grooves 40, 43, and 44. According to the above configuration, the string-like rubber having the significant length is previously prepared, and the string-like rubber can be used while cut out according to the loop route L. Therefore, it is not necessary to produce a sealing member in each casing even if the plurality of casing having different lengths are produced. In the case that the plurality of casing having different widths are produced, similarly the above configuration can easily deal with the casing having different widths by changing the cut-out length of the string-like rubber 7.

In the embodiment, in order to stably fix the light transmissive plate 6, it is necessary to take care of the coupled portion of the string-like rubber 7 such that the coupled portion is not swelled by the sealing agent or such that the coupling is excessively weakened. However, the point to which attention should be paid is restricted because there is only one coupled portion. Therefore, a burden of a worker can be reduced.

In the embodiment, because the frame body 3, the cap 4, and the cap cover 5 are made of metal, the frame body 3, the cap 4, and the cap cover 5 are expanded and contracted to a degree different from that of the string-like rubber 7 when a temperature changes, which results in a risk that the coupling between the end portions is uncoupled by straining the string-like rubber 7. Because the change in shape of the casing 100 in the width direction becomes smaller compared with the length direction of the casing 100, the force straining the coupled portion can be suppressed by providing the coupled portion of the string-like rubber 7 in the groove 40 in the width direction of the casing 100. When an adjustment is performed such that a curvature is provided in a communication portion between the groove 40 and the grooves 43 and 44 on both the sides of the groove 40, the coupled portion can be prevented from moving even if he string-like rubber 7 is strained by the large contraction in the length direction of the casing 100.

Figure 10:
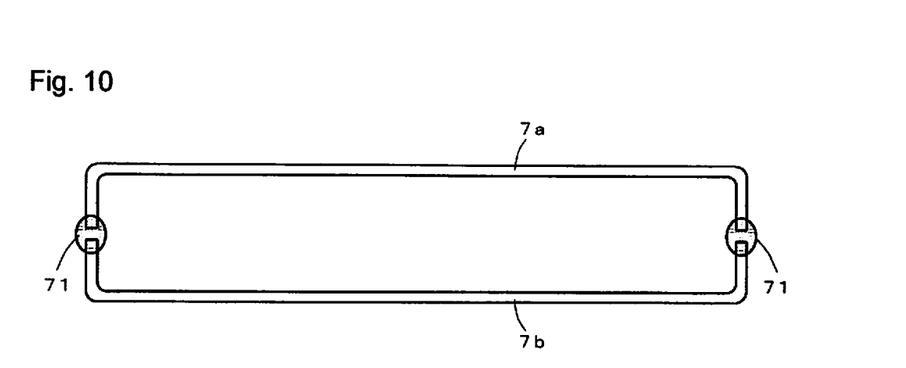
FIG. 10 is an explanatory view illustrating another example of the method for coupling the string-like rubber.

When the strength of the coupled portion of the string-like rubber 7 can be ensured by the above method, and when the prevention of the swelling in the coupled portion and the adjustment of the strength are performed without incident, it is not necessary that the position in which the string-like rubber 7 is coupled be limited to the one point. For example, as illustrated in FIG. 10, using two rubbers 7a and 7b, the coupled portions of the rubbers 7a and 7b may be formed in the grooves 40 of the caps 4 and 4.

In the embodiment, in the support 31 of the frame body 3, the opening of the front surface of the frame body 3 is sealed by the method for inserting the rod-shaped holddown member between the light transmissive plate 6 and the stopper plate 30. Alternatively, a plate-spring stopper plate is used as the stopper plate 30, and the light transmissive plate 6 may be held by the pressing force of the plate spring. In this case, the pawls 51 and 52 cannot be provided in the cap cover 5. However, for example, when the shape of the cap cover 5 is changed so as to be screwed at a proper point in the side surface of the cap 4, the cap cover 5 can stably be fixed.

Figure 11:
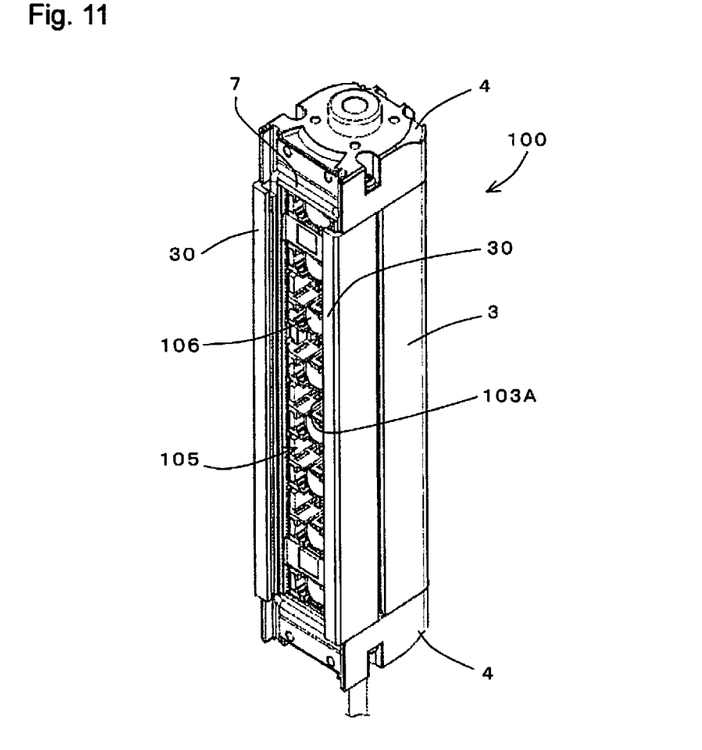
FIG. 11 is a perspective view illustrating a relationship between an optical unit in the casing and a range in which the string-like rubber is provided.

FIG. 11 illustrates a relationship between the optical unit 105 in the casing 100 and the range in which the string-like rubber 7 is disposed. In the optical unit 105 of the embodiment, a plurality of optical modules in each of which the light transmissive element 10 or the light emitting element 20, a lens 106, and a processing circuit are integrated are arrayed along the length direction. The optical unit 105 is accommodated in the casing 100 while each lens 106 is disposed forward in an opening 103A of the front surface of the frame body 3. Because the string-like rubber 7 is disposed so as to surround the range of the outside of the optical unit 105, the light transmissive plate 6 supported by the string-like rubber 7 is fixed in the above-described way to close the opening 103A of the frame body 3 with the light transmissive plate 6. Therefore, the window portion 103 can be formed for the purpose of the light transmission and light reception.

When the optical unit 105 is partially disposed in the cap 4 while being formed longer than the frame body 3, as the range in which the window portion 103 is formed extends into the cap 4, it is necessary that the string-like rubber 7 be disposed so as to correspond to the whole periphery of the extended range. For example, in the upper surface of the cap 4, the range facing the optical unit 105 is opened, and supports including grooves and stopper plates are also provided at both end edges of the opening, and the supports including the grooves and the stopper plates are aligned with the supports 31 and the stopper plates 30 of the frame body 3. A groove is formed in the upper surface of the cap 4 so as to connect ends of grooves of the supports on both the sides along the width direction, and the string-like rubber 7 is disposed so as to go around a loop route including the grooves. Then the end edge of the light transmissive plate 6, which is supported by the string-like rubber 7, is pressed in the same way as the embodiment to fix the light transmissive plate 6 to the opening.

As described above, the string-like rubber 7 is fitted in the grooved loop route L including the supports 31 and 31 provided at both the side edges of the frame body 3 and the grooves 40, 43, and 44 of each cap 4. However, it is not always necessary that the loop route L be grooved.

Figure 12:
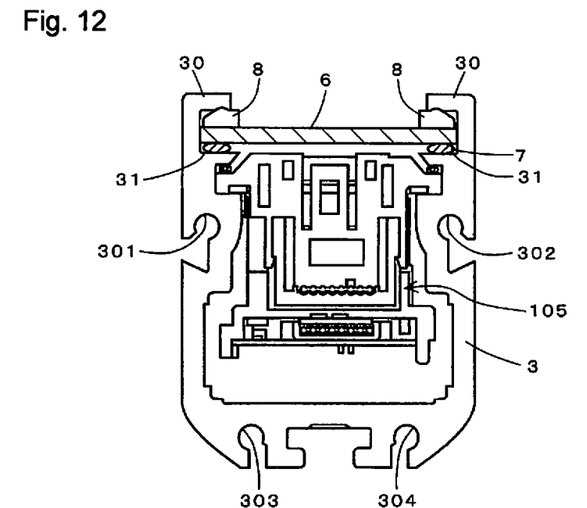
FIG. 12 is a front view illustrating the internal configuration of the frame body including flat supports when the frame body is viewed from an opening end surface.

For example, as illustrated in FIG. 12, the supports 31 and 31 at the side edges of the frame body 3 are changed to flat shapes without groove by removing the stand-up portions 32. Although not illustrated, the grooves 40, 43, and 44 are not provided in the portion of the cap 4, which supports the light transmissive plate 6, but a flat support surface is formed flush with the support 31, and the string-like rubber 7 is disposed so as to go around the support surfaces of the supports 31 and 31 and the caps 4 and 4. Further, the light transmissive plate 6 is disposed on the string-like rubber 7 and the support surfaces, and the light transmissive plate 6 is fixed while being pressed against the string-like rubber 7 by the pressing forces of the holddown members 8 and 8 and the cap covers 5 and 5 similarly to the embodiment. The thickness of the holddown member 8 is slightly increased, and the pressing force is applied until the string-like rubber 7 crushes slightly as illustrated in FIG. 12. Therefore, the disposition state of the string-like rubber 7 can be stabilized to firmly fix the light transmissive plate 6.

Figure 13:
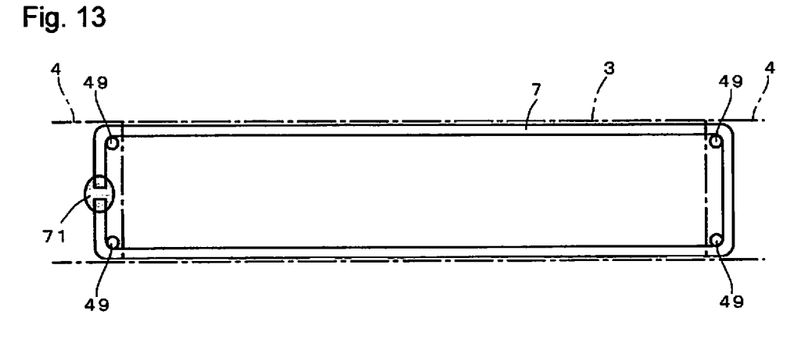
FIG. 13 is an explanatory view illustrating a method for fixing the string-like rubber by four projections and the method for coupling the string-like rubber.

As illustrated in FIG. 13, projections 49 are formed at four points corresponding to the corner portions of the loop route in the supports surfaces of the caps 4 and 4, and the string-like rubber 7 is hooked in the projections 49, which allows the string-like rubber 7 to be more stably disposed.

As described above, when the point of the frame body 3 or the cap 4, at which the string-like rubber 7 is disposed, is formed into the flat shape without grooves, the shapes of the frame body 3 and the cap 4 can be simplified to decrease the number of production processes. Even in the configuration example, as illustrated in FIG. 13, when the end edges of the string-like rubber 7 are coupled with the sealing agent 71 in the support surface of one of the caps 4, the work to dispose the string-like rubber 7 can be facilitated. The string-like rubber 7 can stably be disposed against the expansion and contraction of the casing 100 by providing the coupled portion of the string-like rubber 7 in the width portion of the casing 100.

As described above, the stopper plates 30 and 30 at the side edges of the frame body 3 and the holddown members 8 and 8 inserted below the stopper plates 30 and 30 act as the fixing member that fixes the light transmissive plate 6 in the frame body 3, and the cap covers 5 and 5 that cover the upper surfaces of the caps 4 and 4 act as the fixing member in the caps 4 and 4. Alternatively the fixing members may be integrated. For example, a fixing member, in which an opening is formed at a point corresponding to the window portion 103, has a size corresponding to the whole front surface of the casing 100 including the caps 4 and 4. The fixing member is attached to the frame body 3 and the caps 4 and 4 to apply the pressing force. Therefore, the light transmissive plate 6 can be fixed while being pressed against the string-like rubber 7.

DESCRIPTION OF SYMBOLS

1 Projector
2 Optical receiver
3 Frame body
4 Cap
5 Cap cover
6 Light transmissive plate
7 String-like rubber
8 Holddown member
30 Stopper plate
31 Support
40,43,44 Groove
41,42 Projected thread
51,52 Pawl
55 Notch

The invention claimed is:
1. A multi-optical axis photoelectric sensor comprising a projector and an optical receiver each having an outer shape formed by a casing including a frame body, a pair of caps, and a light transmissive plate, a front surface and both end surfaces of the frame body being opened, the caps closing the opened end surfaces of the frame body, and the light transmissive plate closing the opened front surface of the frame body, wherein
a long support extends along a corresponding side edge of an opening of the front surface is formed in an inner surface of each side plate of the frame body, the side edges of the light transmissive plate are supported by each support of the frame body, the end portions of the light transmissive plate are supported by the caps, respectively, a communication portion communicating with each support of the frame body is included in a portion of the cap, which supports the light transmissive plate, a string-like elastic member is disposed to go around a closed loop including each support of the frame body and the communication portion of each cap, and the light transmissive plate is sandwiched and held between at least one of fixing members and the string-like elastic member, the fixing members being disposed with respect to the frame body and the caps.

2. The multi-optical axis photoelectric sensor according to claim 1, wherein the string-like elastic member has a length that goes around the closed loop including each support of the frame body and the communication portion of each cap, and wherein end edges of the string-like elastic member are bonded with a bonding agent in the communication portion of one of the caps.

3. The multi-optical axis photoelectric sensor according to claim 1, wherein a groove is formed in each support of the frame body, a pair of grooves communicating with the groove in each support of the frame body and a groove along the end edge of the supported light transmissive plate are included in the communication portion of each cap, and the string-like elastic member is fitted in the grooves of the frame body and each cap so as to go around the closed loop formed by the grooves.

4. The multi-optical axis photoelectric sensor as in claim 1, wherein the front surface of the frame body is opened while belt-shaped stopper plates are left at both side edges, a rod-shaped holddown member is positioned between each stopper plate and the light transmissive plate supported the stripe-like elastic member interposed therebetween, a portion of each cap, in which the light transmissive plate is supported, is covered with a cap cover in which a pair of pawls are provided at one end edge, a gap is provided between the rod-shaped holddown member and each end surface of the frame body, and each cap cover is fixed to the cap with the pawl positioned in each gap.

5. The multi-optical axis photoelectric sensor according to claim 2, wherein a groove is formed in each support of the frame body, a pair of grooves communicating with the groove in each support of the frame body and a groove along the end edge of the supported light transmissive plate are included in the communication portion of each cap, and the string-like elastic member is fitted in the grooves of the frame body and each cap so as to go around the closed loop formed by the grooves.

6. The multi-optical axis photoelectric sensor as in claim 2, wherein the front surface of the frame body is opened while belt-shaped stopper plates are left at both side edges, a rod-shaped holddown member is positioned between each stopper plate and the light transmissive plate supported the stripe-like elastic member interposed therebetween, a portion of each cap, in which the light transmissive plate is supported, is covered with a cap cover in which a pair of pawls are provided at one end edge, a gap is provided between the rod-shaped holddown member and each end surface of the frame body, and each cap cover is fixed to the cap with the pawl positioned in each gap.

7. The multi-optical axis photoelectric sensor as in claim 3, wherein the front surface of the frame body is opened while belt-shaped stopper plates are left at both side edges, a rod-shaped holddown member is positioned between each stopper plate and the light transmissive plate supported the stripe-like elastic member interposed therebetween, a portion of each cap, in which the light transmissive plate is supported, is covered with a cap cover in which a pair of pawls are provided at one end edge, a gap is provided between the rod-shaped holddown member and each end surface of the frame body, and each cap cover is fixed to the cap with the pawl positioned in each gap.

8. The multi-optical axis photoelectric sensor as in claim 5, wherein the front surface of the frame body is opened while belt-shaped stopper plates are left at both side edges, a rod-shaped holddown member is positioned between each stopper plate and the light transmissive plate supported the stripe-like elastic member interposed therebetween, a portion of each cap, in which the light transmissive plate is supported, is covered with a cap cover in which a pair of pawls are provided at one end edge, a gap is provided between the rod-shaped holddown member and each end surface of the frame body, and each cap cover is fixed to the cap with the pawl positioned in each gap.

* * * * *